United States Patent
Shor et al.

(10) Patent No.: US 6,864,739 B2
(45) Date of Patent: *Mar. 8, 2005

(54) CHARGE PUMP STAGE WITH BODY EFFECT MINIMIZATION

(75) Inventors: Joseph S. Shor, Tel Mond (IL); Eduardo Maayan, Kfat Saba (IL); Yan Polansky, Ramat Gan (IL)

(73) Assignee: Saifun Semiconductors Ltd., Netanya (IL)

( * ) Notice: Subject to any disclaimer, the term of this patent is extended or adjusted under 35 U.S.C. 154(b) by 0 days.

This patent is subject to a terminal disclaimer.

(21) Appl. No.: 10/740,616

(22) Filed: Dec. 22, 2003

(65) Prior Publication Data

US 2004/0130385 A1 Jul. 8, 2004

Related U.S. Application Data

(63) Continuation of application No. 09/826,351, filed on Apr. 5, 2001, now Pat. No. 6,677,805.

(51) Int. Cl.[7] ................................................. G05F 1/10
(52) U.S. Cl. ........................ 327/536; 327/537; 363/60
(58) Field of Search ................................ 327/530, 536, 327/537, 589; 363/60, 59

(56) References Cited

U.S. PATENT DOCUMENTS

| 3,895,360 A | 7/1975 | Cricchi et al. |
|---|---|---|
| 4,016,588 A | 4/1977 | Ohya et al. |
| 4,017,888 A | 4/1977 | Christie et al. |
| 4,151,021 A | 4/1979 | McElroy |
| 4,173,766 A | 11/1979 | Hayes |
| 4,173,791 A | 11/1979 | Bell |
| 4,281,397 A | 7/1981 | Neal et al. |
| 4,306,353 A | 12/1981 | Jacobs et al. |
| 4,342,149 A | 8/1982 | Jacobs et al. |
| 4,360,900 A | 11/1982 | Bate |
| 4,380,057 A | 4/1983 | Kotecha et al. |
| 4,388,705 A | 6/1983 | Sheppard |
| 4,389,705 A | 6/1983 | Sheppard |
| 4,471,373 A | 9/1984 | Shimizu et al. |
| 4,527,257 A | 7/1985 | Cricchi |
| 4,586,163 A | 4/1986 | Koike |
| 4,630,085 A | 12/1986 | Koyama |
| 4,667,217 A | 5/1987 | Janning |

(List continued on next page.)

FOREIGN PATENT DOCUMENTS

| EP | 0693781 | 7/1994 |
|---|---|---|
| EP | 0751560 | 6/1995 |
| EP | 1073120 | 7/2000 |
| GB | 2157489 | 3/1984 |
| JP | 04291962 | 3/1991 |
| JP | 05021758 | 7/1991 |
| JP | 04226071 | 8/1992 |
| JP | 07193151 | 12/1993 |
| JP | 09162314 | 12/1995 |
| WO | WO 96/15553 | 11/1994 |
| WO | WO 99/31670 | 12/1997 |

OTHER PUBLICATIONS

U.S. Appl. No. 08/902,890, filed May 4, 2000, Eitan.
U.S. Appl. No. 08/905,286, filed Jul. 30, 1997, Eitan.

(List continued on next page.)

*Primary Examiner*—Dinh T. Le
(74) *Attorney, Agent, or Firm*—Eitan, Pearl, Latzer & Cohen Zedek, LLP

(57) ABSTRACT

A method for operating a charge pump, the method including biasing a bulk of a charge pump stage so as to reduce body effect without forward biasing diodes of the charge pump stage.

3 Claims, 7 Drawing Sheets

U.S. PATENT DOCUMENTS

| | | |
|---|---|---|
| 4,780,424 A | 10/1988 | Holler et al. |
| 4,847,808 A | 7/1989 | Kobatake |
| 4,870,470 A | 9/1989 | Bass, Jr. et al. |
| 4,916,671 A | 4/1990 | Ichiguchi |
| 4,941,028 A | 7/1990 | Chen et al. |
| 5,021,999 A | 6/1991 | Kohda et al. |
| 5,075,245 A | 12/1991 | Woo et al. |
| 5,117,389 A | 5/1992 | Yiu |
| 5,168,334 A | 12/1992 | Mitchell et al. |
| 5,172,338 A | 12/1992 | Mehrotra et al. |
| 5,175,120 A | 12/1992 | Lee |
| 5,204,835 A | 4/1993 | Eitan |
| 5,214,303 A | 5/1993 | Aoki |
| 5,241,497 A | 8/1993 | Komarek |
| 5,260,593 A | 11/1993 | Lee |
| 5,268,861 A | 12/1993 | Hotta |
| 5,289,412 A | 2/1994 | Frary et al. |
| 5,293,563 A | 3/1994 | Ohta |
| 5,305,262 A | 4/1994 | Yoneda |
| 5,311,049 A | 5/1994 | Tsuruta |
| 5,315,541 A | 5/1994 | Harari et al. |
| 5,345,425 A | 9/1994 | Shikatani |
| 5,349,221 A | 9/1994 | Shimoji |
| 5,350,710 A | 9/1994 | Hong et al. |
| 5,359,554 A | 10/1994 | Odake et al. |
| 5,393,701 A | 2/1995 | Ko et al. |
| 5,394,355 A | 2/1995 | Uramoto et al. |
| 5,399,891 A | 3/1995 | Yiu et al. |
| 5,412,601 A | 5/1995 | Sawada et al. |
| 5,414,614 A * | 5/1995 | Fette et al. .................... 363/59 |
| 5,414,693 A | 5/1995 | Ma et al. |
| 5,418,176 A | 5/1995 | Yang et al. |
| 5,418,743 A | 5/1995 | Tomioka et al. |
| 5,422,844 A | 6/1995 | Wolstenholme et al. |
| 5,424,978 A | 6/1995 | Wada et al. |
| 5,426,605 A | 6/1995 | Van Berkel et al. |
| 5,434,825 A | 7/1995 | Harari |
| 5,450,341 A | 9/1995 | Sawada et al. |
| 5,450,354 A | 9/1995 | Sawada et al. |
| 5,467,308 A | 11/1995 | Chang et al. |
| 5,477,499 A | 12/1995 | Van Buskirk et al. |
| 5,495,440 A | 2/1996 | Asakura |
| 5,496,753 A | 3/1996 | Sakurai et al. |
| 5,521,870 A | 5/1996 | Ishikawa |
| 5,523,251 A | 6/1996 | Hong |
| 5,553,018 A | 9/1996 | Wang et al. |
| 5,583,808 A | 12/1996 | Brahmbhatt |
| 5,599,727 A | 2/1997 | Hakozaki et al. |
| 5,623,438 A | 4/1997 | Guritz et al. |
| 5,654,568 A | 8/1997 | Nakao |
| 5,656,513 A | 8/1997 | Wang et al. |
| 5,661,060 A | 8/1997 | Gill et al. |
| 5,683,925 A | 11/1997 | Irani et al. |
| 5,712,814 A | 1/1998 | Fratin et al. |
| 5,726,946 A | 3/1998 | Yamagata et al. |
| 5,751,037 A | 5/1998 | Aozasa et al. |
| 5,754,475 A | 5/1998 | Bill et al. |
| 5,777,919 A | 7/1998 | Chi-Yung et al. |
| 5,787,036 A | 7/1998 | Okazawa |
| 5,793,079 A | 8/1998 | Georgescu et al. |
| 5,834,851 A | 11/1998 | Ikeda et al. |
| 5,836,772 A | 11/1998 | Chang et al. |
| 5,841,700 A | 11/1998 | Chang |
| 5,847,441 A | 12/1998 | Cutter et al. |
| 5,862,076 A | 1/1999 | Eitan |
| 5,864,164 A | 1/1999 | Wen |
| 5,870,335 A | 2/1999 | Khan et al. |
| 5,946,558 A | 8/1999 | Hsu |
| 5,949,728 A | 9/1999 | Liu et al. |
| 5,963,412 A | 10/1999 | En |
| 5,963,465 A | 10/1999 | Eitan |
| 5,966,603 A | 10/1999 | Eitan |
| 5,973,373 A | 10/1999 | Krautschneider et al. |
| 5,990,526 A | 11/1999 | Bez et al. |
| 5,991,202 A | 11/1999 | Derhacobian et al. |
| 6,018,186 A | 1/2000 | Hsu |
| 6,020,241 A | 2/2000 | You et al. |
| 6,028,324 A | 2/2000 | Su et al. |
| 6,030,871 A | 2/2000 | Eitan |
| 6,034,403 A | 3/2000 | Wu |
| 6,063,666 A | 5/2000 | Chang et al. |
| 6,064,251 A | 5/2000 | Park |
| 6,075,402 A | 6/2000 | Ghilardelli et al. |
| 6,094,095 A | 7/2000 | Murray et al. |
| 6,128,226 A | 10/2000 | Eitan et al. |
| 6,130,572 A | 10/2000 | Ghilardelli et al. |
| 6,134,156 A | 10/2000 | Eitan |
| 6,137,718 A | 10/2000 | Reisinger |
| 6,163,048 A | 12/2000 | Hirose et al. |
| 6,198,342 B1 | 3/2001 | Kawai |
| 6,288,603 B1 * | 9/2001 | Zanuccoli et al. .......... 327/544 |
| 6,448,842 B2 * | 9/2002 | Zanuccoli et al. .......... 327/536 |

OTHER PUBLICATIONS

U.S. Appl. No. 09/082,280, filed May 20, 1998, Eitan.
U.S. Appl. No. 09/348,720, filed Jul. 6, 1999.
U.S. Appl. No. 09/413,408, filed Oct. 6, 1999.
U.S. Appl. No. 09/536,125, filed Mar. 28, 2000.
Ricco, Bruno, "Nonvolatile Multilevel Memories for Digital Application," *IEEE*, vol. 86, No. 12, pp. 2399–2421, Issued 1998.
"2 Bit/Cell EEPROM Cell Using Band–To–Band Tunneling For Data Read–Out," *IBM Technical Disclosure Bulletin*, U.S. IBM Corp. NY vol. 35, No. 4B, ISSN:0018–8689, Sep., 1992.
Hsing–Huang Tsent et al. "Thin CVD Gate Dielectric for USL Technology", *IEEE*, 0–7803–1450–6, 1993.
Pickar, K.A., "Ion Implantation in Silicon," *Applied Solid State Science*, vol. 5, R. Wolfe Edition, Academic Press, New York, 1975.
Bhattacharyya et al., "FET Gate Structure for Nonvolatile N–Channel Read–Mostly Memory Device," *IBM Technical Disclosure Bulletin*, U.S. IBM Corp. vol. 18, No. 6, p. 1768, 1976.

* cited by examiner

CHARGE PUMP STAGE WITH BODY EFFECT MINIMIZATION

CROSS-REFERENCE TO RELATED APPLICATIONS

This application is a continuation of U.S. patent application Ser. No. 09/826,351, filed Apr. 5, 2001, now U.S. Pat. No. 6,677,805, which is hereby incorporated by reference.

FIELD OF THE INVENTION

The present invention relates generally to charge pumps for boosting voltages in microelectronic circuitry, and particularly to a charge pump stage architecture with body effect minimization.

BACKGROUND OF THE INVENTION

Non-volatile memory arrays, such as erasable, programmable read only memory (EPROM) or flash memory arrays, or electrically erasable, programmable read only memory (EEPROM) arrays, require high positive or negative voltages to program and erase memory cells of the array. Typically, these voltages are higher than the voltage supplied ($V_{dd}$). Charge pumps are generally used to boost on-chip voltages above the supply voltage $V_{dd}$ to reach the voltages required for programming or erasing.

A charge pump typically comprises cascaded stages that progressively boost the voltage to higher levels. The charge pump functions by progressively storing more charge on a capacitor which is part of a capacitor-diode combination, with several such stages being placed together in a network to obtain the desired increase in voltage. The diode functions to prevent discharge of the capacitor prior to placing the additional charge thereon.

Reference is now made to FIGS. 1A and 1B, which illustrate a commonly used charge pump architecture, called a four-phased-clock, threshold-voltage-canceling pump architecture, for a four-stage charge pump (see Umezawa, IEEE Journal of Solid State Circuits, Vol. 27, 1992, page 1540). FIG. 1A illustrates two stages of the charge pump in greater detail than FIG. 1B, which illustrates four stages of the charge pump.

The charge pump circuit includes a plurality of charge transfer transistors (reference letters $m_i$) connected in series. In FIG. 1B, four such charge transfer transistors are shown, labeled $m_1$, $m_2$, $m_3$ and $m_4$. Charge transfer transistors $m_i$ may use, but are not limited to, CMOS (complementary metal oxide semiconductor) technology, being either n-channel or p-channel (NMOS or PMOS) field effect transistors (FETs). (As explained further hereinbelow, NMOS is generally used to pump positive voltages, whereas PMOS is generally used to pump negative voltages.) The MOSFETs have a control electrode (gate, labeled g), a first electrode (drain, labeled d) and a second electrode (source, labeled s), connected to nodes, as described hereinbelow. (Since MOSFETs are typically symmetrical components, the true designation of "source" and "drain" is only possible once a voltage is impressed on the terminals of the transistors. The designations of source and drain throughout the specification should be interpreted, therefore, in the broadest sense.) Preferably, the bulks (labeled b) of the charge transfer transistors $m_i$ are coupled to a reference line (shown as REF in FIG. 1A, but omitted for the sake of simplicity in FIG. 1B) for receiving a reference voltage, generally ground in the case of NMOS.

FIGS. 1A and 1B illustrate a positive charge pump based on NMOS. The source of charge transfer transistor $m_1$ is connected to node $n_0$, which is connected to $V_{dd}$. The gate of charge transfer transistor $m_1$ is connected to node $g_1$, and the drain is connected to node $n_1$. The source of charge transfer transistor $m_2$ is connected to node $n_1$, the gate is connected to node $g_2$, and the drain is connected to node $n_2$. Similarly, as shown in FIG. 1B, the source of charge transfer transistor $m_3$ is connected to node $n_2$, the gate to node $g_3$, and the drain to node $n_3$. Likewise, the source of charge transfer transistor $m_4$ is connected to node $n_3$, the gate to node $g_4$, and the drain to node $n_4$.

Two-phase, non-overlapping pulse trains $PH_1$ and $PH_2$ are provided, such as from a pulse generator (not shown). By non-overlapping it is meant that 0 to 1, and 1 to 0 voltage transitions of one pulse never overlap with the transitions of the other pulse. The $PH_1$ and $PH_2$ phases inject energy into the pump through large capacitors 5 into nodes $n_i$. Accordingly, in the illustrated embodiment, a large capacitor 5 is connected from pulse train $PH_1$ to node $n_1$, and another large capacitor 5 is connected from pulse train $PH_1$ to node $n_3$. Another large capacitor 5 is connected from pulse train $PH_2$ to node $n_2$, and another large capacitor 5 is connected from pulse train $PH_2$ to node $n_4$. The charge is transferred along the pump through charge transfer transistors $m_i$ connecting node $n_i$ to node $n_{i+1}$.

Similarly, two-phase, non-overlapping pulse trains $PH_{1A}$ and $PH_{2A}$ are also provided. The $PH_{1A}$ and $PH_{2A}$ phases inject energy into the pump through small capacitors 11 into nodes $g_i$. Capacitors 11 preferably have a much smaller capacitance than large capacitors 5. In the illustrated embodiment, a small capacitor 11 is connected from pulse train $PH_{1A}$ to node $g_2$, and another small capacitor 11 is connected from pulse train $PH_{1A}$ to node $g_4$. Another small capacitor 11 is connected from pulse train $PH_{2A}$ to node $g_1$, and another small capacitor 11 is connected from pulse train $PH_{2A}$ to node $g_3$.

As seen in FIGS. 1A and 1B, a plurality of auxiliary transistors $t_i$ (i.e., $t_1$, $t_2$, $t_3$ and $t_4$) are provided. Each auxiliary transistor $t_i$ has its drain connected to the gate node $g_i$ of each charge transfer transistor $m_i$ (i.e., $m_1$, $m_2$, $m_3$ and $m_4$, respectively). The source of each auxiliary transistor $t_i$ is connected to the source of each charge transfer transistor $m_i$ (i.e., node $n_{i-1}$). The gate of each auxiliary transistor $t_i$ is connected to the drain of each charge transfer transistor $m_i$ (i.e., node $n_i$). The bulk of each auxiliary transistor $t_i$ is connected to the bulk of each charge transfer transistor $m_i$, which is generally grounded. The auxiliary transistors $t_i$ and the $PH_{1A}$ and $PH_{2A}$ phases control the gate voltage of the charge transfer transistors $m_i$.

The operation of the first stage of the pump is now explained, with all subsequent stages operating in the same manner. The operation commences with the $PH_1$ phase starting to rise. Initially, charge transfer transistors $m_1$ and $m_2$ are non-conducting (i.e., turned off), since the $PH_{1A}$ and $PH_{2A}$ phases are in their low phase. The $PH_1$ phase then fully rises and injects energy into node $n_1$, raising (or "pushing") node $n_1$ to a voltage boosted above $V_{dd}$, such as $2V_{dd}$. The rise of node $n_1$ forces node $g_1$ to $V_{dd}$ through auxiliary transistor $t_1$. Since the source of charge transfer transistor $m_1$ is connected to $V_{dd}$ at node $n_0$, the gate-source voltage bias $V_{gs}$ of charge transfer transistor $m_1$ is zero, assuring that transistor $m_1$ is turned off.

After a short time, typically in the order of several nanoseconds, the $PH_{1A}$ phase rises, which makes charge transfer transistor $m_2$ conduct (i.e., turns on). During this time, node $n_1$ is at a higher voltage than node $n_2$. Since, as just mentioned, charge transfer transistor $m_2$ is conducting, charge is transferred from node $n_1$ to node $n_2$. During the next phase, the $PH_2$ phase rises and the $PH_1$ phase drops. This causes node $n_1$ to drop and node $n_2$ to rise, thereby causing charge to be transferred from node $n_2$ to node $n_3$. In this manner charge is transferred along the pump. Each of the $g_i$ nodes is raised by a $V_{dd}$ level with respect to the $n_i$ nodes when charge transfer is taking place. In the latter stages of the pump, the source and drain nodes (i.e., nodes $n_3$ and $n_4$) are raised well above the bulk, which is usually grounded.

The large voltage difference between the high source/drain voltages and the low bulk voltage causes a problem, called the body or bulk effect, which is now explained. (The terms body and bulk are used interchangeably throughout the specification and claims.)

Positive charge pumps generally use NMOS transistors, and this requires the body of the charge transfer transistors to be at the lowest voltage, in general ground (GND). (Negative charge pumps have the opposite requirement, and PMOS transistors are generally used.) However, in positive charge pumps there can be a significant loss of energy in the latter pump stages due to the "body effect". In NMOS, the body effect is an increase in the threshold voltage ($V_t$), due to the fact that the bulk or body of the transistor is at a lower voltage than the source. Due to the body effect, the threshold voltage $V_t$ of the NMOS transistors progressively increases from the stages near the input terminal of the charge pump to the stages near the output terminal. For example, in the prior art charge pump of FIG. 1, the threshold voltage $V_t$ of charge transfer transistors $m_i$ progressively increases from transistor $m_1$ to transistor $m_4$. In transistor $m_4$, as mentioned hereinabove, the source and drain nodes $n_3$ and $n_4$, have been raised well above the bulk. This reduces the efficiency of the charge pump, because, the voltage gain of each stage decreases, which means that a higher number of stages is necessary for generating a given voltage.

In some CMOS processes, such as triple-well and silicon-on-insulator (SOI), it is possible to raise the bulk of the NMOS charge transfer transistors above the grounded substrate, which would reduce the body effect by diminishing the voltage difference between the bulk and the source/drain. However, in the prior art, this entails certain risks. For example, if the bulk voltage is raised above the source or drain voltage, then parasitic bipolar transistors (typically used in CMOS circuitry) can turn on, which can cause either latchup or drain the charge from the pump.

In many circuits, not necessarily charge pumps, the bulk effect is eliminated by connecting the bulk node to the source node. This is not possible in a charge pump, however, because the "source" can be higher or lower than the "drain" by $V_{dd}$, depending upon the clock cycle. This would cause parasitic diodes to turn on, resulting in the unwanted bipolar transistor turn-on and latchup.

One method for compensating for the body effect is described in U.S. Pat. No. 6,064,251 to Park. Park uses charge pump stages coupled in series. Each charge pump stage has two clock terminals that receive two phase shifted clock signals. The charge pump stages are configured so that adjacent charge pump stages receive different clock signals. The phases of the clock signals are such that the pump elements are boosted well above the threshold voltage $V_t$, thereby providing the transistors with sufficient overdrive to transfer energy along the pump. However, clock boosting uses a significant amount of power consumption and is thus very wasteful.

SUMMARY OF THE INVENTION

The present invention provides a novel charge pump stage for pumping high positive voltages, which minimizes the abovementioned body effect.

In the present invention, an NMOS transistor, preferably configured as a source follower, raises the bulk voltage of a charge pump stage to a level below or equal to the minimum of the source and drain voltage of the charge transfer transistor at that stage. In one embodiment, for triple-well technology, the body effect is reduced by raising P-wells of the NMOS transistors to a level below or equal to the minimum of the source/drain voltages of the entire clock cycle. This limits the increase of the threshold voltages ($V_t$) of the transistors at high voltage, which significantly improves pumping efficiency. At no point is the bulk voltage higher than the source/drain voltage.

There is thus provided in accordance with a preferred embodiment of the present invention a method for operating a charge pump, the method including biasing a bulk voltage of a charge pump stage so as to reduce body effect without forward biasing diodes of the charge pump stage.

In accordance with a preferred embodiment of the present invention the bulk voltage of the charge pump stage is raised to a level below a minimum of source/drain voltages of a charge transfer transistor at that stage.

Further in accordance with a preferred embodiment of the present invention a bulk voltage of a present charge pump stage is raised by using an output of a previous charge pump stage as an input to a gate of a source follower transistor to drive the bulk voltage of the present charge pump stage.

Still further in accordance with a preferred embodiment of the present invention an output of the source follower transistor is lower than an input of the source follower transistor by a threshold voltage $V_t$.

In accordance with a preferred embodiment of the present invention the charge pump stage employs triple-well transistors.

Further in accordance with a preferred embodiment of the present invention voltages of P-wells of the transistors are raised to a level not greater than the minimum of the source and drain voltages of the transistors.

In accordance with a preferred embodiment of the present invention the transistors include NMOS (n-channel metal oxide semiconductor) transistors.

There is also provided in accordance with a preferred embodiment of the present invention a charge pump including a plurality of positive charge pump stages, each stage including at least one NMOS charge transfer transistor, wherein a bulk voltage of the at least one charge transfer transistor is raised to a level not greater than a minimum of a voltage level of a source and a drain of the at least one charge transfer transistor in that charge pump stage.

In accordance with a preferred embodiment of the present invention there is also provided a circuit that drives the bulk voltages.

Further in accordance with a preferred embodiment of the present invention an input to a previous charge pump stage is used as an input to the circuit that drives the bulk of the present charge pump stage.

Still further in accordance with a preferred embodiment of the present invention the circuit includes a transistor configured as a source follower.

Additionally in accordance with a preferred embodiment of the present invention the circuit includes at least one of a comparator, a level shifter, an operative amplifier (OP-AMP), and an inverting stage.

In accordance with a preferred embodiment of the present invention, at at least one of the charge pump stages, a gate of the source follower is driven by an input voltage and a source of the source follower drives the bulk.

Further in accordance with a preferred embodiment of the present invention the input to a previous charge pump stage is applied to the gate of the source follower of the present charge pump stage.

Still further in accordance with a preferred embodiment of the present invention the source of the source follower drives the bulk of all transistors in the present charge pump stage.

Additionally in accordance with a preferred embodiment of the present invention the bias on the gate of the source follower is an available voltage.

There is also provided in accordance with a preferred embodiment of the present invention a charge pump including a plurality of positive charge pump stages, each stage including at least one NMOS charge transfer transistor, wherein a bulk voltage of at least one of the charge pump stages is biased so as to reduce body effect without forward biasing diodes of that at least one charge pump stage.

In accordance with a preferred embodiment of the present invention a bulk voltage of at least one of the charge transfer transistors is raised to a level not greater than a minimum of a voltage level of a source and a drain of the at least one charge transfer transistor in that charge pump stage.

There is also provided in accordance with a preferred embodiment of the present invention a charge pump including at least one positive charge pump stage including at least one NMOS charge transfer transistor $m_i$, which includes a control terminal and first, second and third terminals, wherein the control terminal of the at least one charge transfer transistor $m_i$ is connected to a node $g_i$, the first terminal of the at least one charge transfer transistor $m_1$ is connected to a node $n_{i-1}$, the second terminal of the at least one charge transfer transistor $m_1$ is connected to a node $n_i$, at least one source follower $s_i$ including a control terminal and first, second and third terminals, wherein the control terminal of the at least one source follower $s_i$ is driven by a first voltage, the first and third terminals of the at least one source follower $s_i$ are connected through nodes $p_i$ and $q_i$ to the third terminal of the at least one charge transfer transistor $m_i$, and the second terminal of the at least one source follower $s_i$ is connected to a second voltage, at least one first pulse train adapted to inject energy into the pump via a first capacitor into node $n_i$, at least one second pulse train adapted to inject energy into the pump via a second capacitor into node $g_i$, at least one auxiliary transistor $t_i$ including a control terminal and first, second and third terminals, wherein the second terminal of the at least one auxiliary transistor $t_i$ is connected to the control terminal of the at least one charge transfer transistor $m_i$, the first terminal of the at least one auxiliary transistor $t_i$ is connected to the first terminal of the at least one charge transfer transistor $m_i$, the control terminal of the at least one auxiliary transistor $t_i$ is connected to the second terminal of the at least one charge transfer transistor $m_i$, and the third terminal of the at least one auxiliary transistor $t_i$ is connected to the third terminal of the at least one charge transfer transistor $m_i$.

In accordance with a preferred embodiment of the present invention, for i>2, the control terminal of the at least one source follower $s_i$ is driven by an input voltage from a previous stage, the input voltage being the input to the charge transfer transistor $m_{i-2}$ at the $n_{i-3}$ node.

Further in accordance with a preferred embodiment of the present invention, for i>2, the control terminal of the at least one source follower $s_i$ is driven by an input voltage from a previous stage, the input voltage being the input to the charge transfer transistor $m_{i-1}$ at a node previous to the $n_{i-2}$ node.

Still further in accordance with a preferred embodiment of the present invention the second voltage is at node $g_i$.

In accordance with a preferred embodiment of the present invention the second voltage is at an output of the charge pump stage.

Further in accordance with a preferred embodiment of the present invention the second voltage is at an output or input of the charge pump.

In accordance with a preferred embodiment of the present invention the control terminal includes a gate of the transistor, the first terminal includes a source of the transistor, the second terminal includes a drain of the transistor, and the third terminal includes a bulk of the transistor.

BRIEF DESCRIPTION OF THE DRAWINGS

The present invention will be understood and appreciated more fully from the following detailed description taken in conjunction with the drawings in which:

FIGS. 1A and 1B are simplified circuit diagrams of a charge pump architecture commonly used in the prior art, comprising a threshold-voltage-canceling four-phased charge pump, wherein FIG. 1A illustrates two stages of the charge pump and FIG. 1B illustrates four stages of the charge pump;

DETAILED DESCRIPTION OF A PREFERRED EMBODIMENT

The charge transfer transistors of the present invention are preferably NMOS transistors that have a P-well (PW) isolated from a P-substrate of the integrated circuit (IC), as is now described. This allows independent biasing of the specific NMOS transistor's bulk with respect to the substrate of the IC, which is preferably always grounded.

Figure 4:
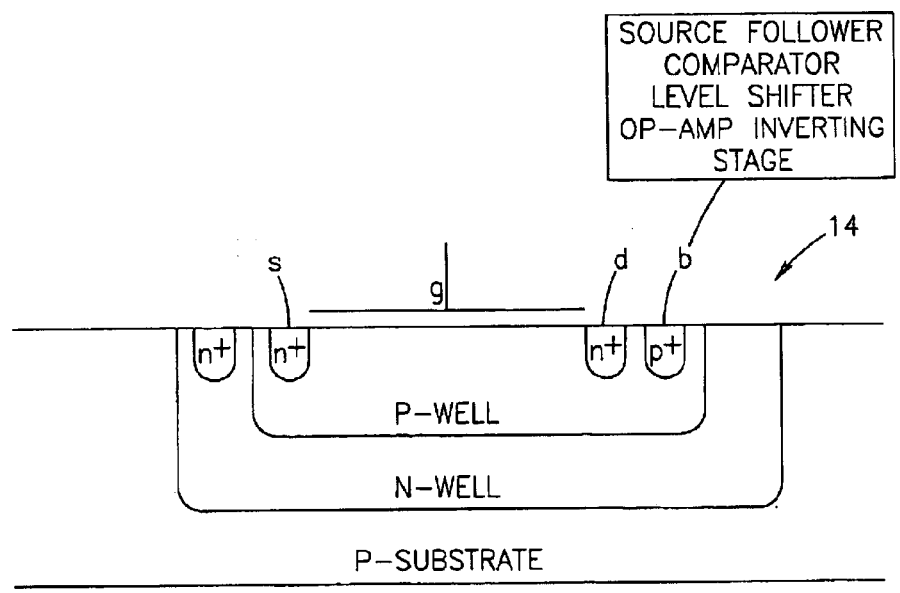
FIG. 4 is a simplified illustration of one embodiment of charge transfer transistors of the charge pump of the present invention, that of a triple-well NMOS transistor.

One way of isolating the P-well from the P-substrate is illustrated in FIG. 4, to which reference is now made. In this embodiment, each charge transfer transistor is a triple-well NMOS transistor 14. Transistor 14 includes a P-well isolated from a P-substrate by an N-well. Two $n^+$ regions are preferably formed in the P-well for connecting to the source and drain. A $p^+$ region is preferably formed in the P-well for connecting to the bulk. An $n^+$ region is preferably formed in the N-well, which is connected to a voltage equal to or higher than $p^+$.

Other transistor architectures may be used to carry out the invention other than triple-well technology. For example, the P-well may be isolated from the P-substrate by an SOI structure. SOI is very well known in the art. One example is an SOS (silicon-on-sapphire) structure formed by heteroepitaxy of silicon on a monocrystalline sapphire substrate by CVD (chemical vapor deposition). Another example is that of SIMOX (separation by ion-implanted oxygen) in which an $SiO_2$ layer is formed by ion implantation of oxygen into a silicon monocrystalline substrate.

Figure 2A:
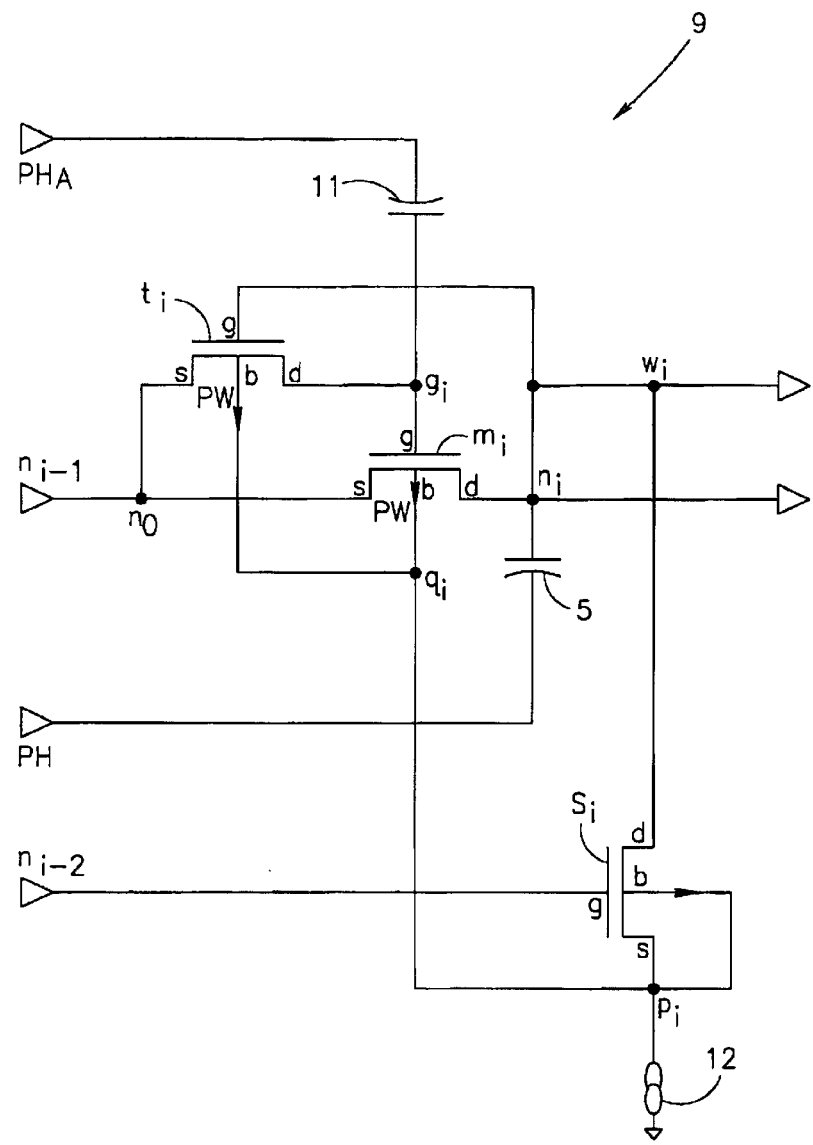
FIG. 2A is a simplified circuit diagram of a single-stage charge pump, constructed and operative in accordance with a preferred embodiment of the present invention.

Reference is now made to FIG. 2A, which illustrates a single-stage of a charge pump 9 in accordance with a preferred embodiment of the present invention.

Charge pump 9 preferably includes an NMOS charge transfer transistor $m_i$ whose source is connected to node $n_{i-1}$. The gate of charge transfer transistor $m_i$ is connected to node $g_i$, and the drain is connected to node $n_i$. A pulse train PH injects energy into the pump through a large capacitor 5 connected to node $n_i$. Another pulse trains $PH_A$ injects energy into the pump through a small capacitor 11 into node $g_i$.

An auxiliary transistor $t_i$ has its drain connected to the gate node $g_i$ of charge transfer transistor $m_i$. The source of auxiliary transistor $t_i$ is connected to the source of charge transfer transistor $m_i$ (i.e., node $n_{i-1}$). The gate of auxiliary transistor $t_i$ is connected to the drain of charge transfer transistor $m_i$ (i.e., node $n_i$). The auxiliary transistor $t_i$ and the $PH_A$ phase control the gate voltage of the charge transfer transistor $m_i$.

Charge pump 9 includes an additional transistor $s_i$, preferably configured as a source follower. A source follower is a method of configuring a FET, wherein the output voltage is at the source, and it "follows" the input voltage, which is connected to the gate. By "following" it is meant that the output voltage equals the input voltage minus the threshold voltage. In the present invention, the input of the source follower $s_i$ is from a previous pump stage and is used to drive the bulk of a subsequent pump stage, as is described more in detail hereinbelow with reference to the multi-stage charge pump of FIG. 2B.

In the circuitry of FIG. 2A, the gate of source follower $s_i$ is connected to node $n_{i-2}$, which may receive some bias voltage. The source and bulk of source follower $s_i$ are connected to the bulk of charge transfer transistor $m_i$ and to the bulk of auxiliary transistor $t_i$ via a node $p_i$ and a node $q_i$. Node $p_i$ may be connected to a bleeder element 12, which may be a current source, and which is described further hereinbelow with reference to FIG. 3. The drain of source follower $s_i$ is connected to a high voltage, such as at a node $w_i$, which may be the pump output or the stage output or input, for example.

Figure 2B:
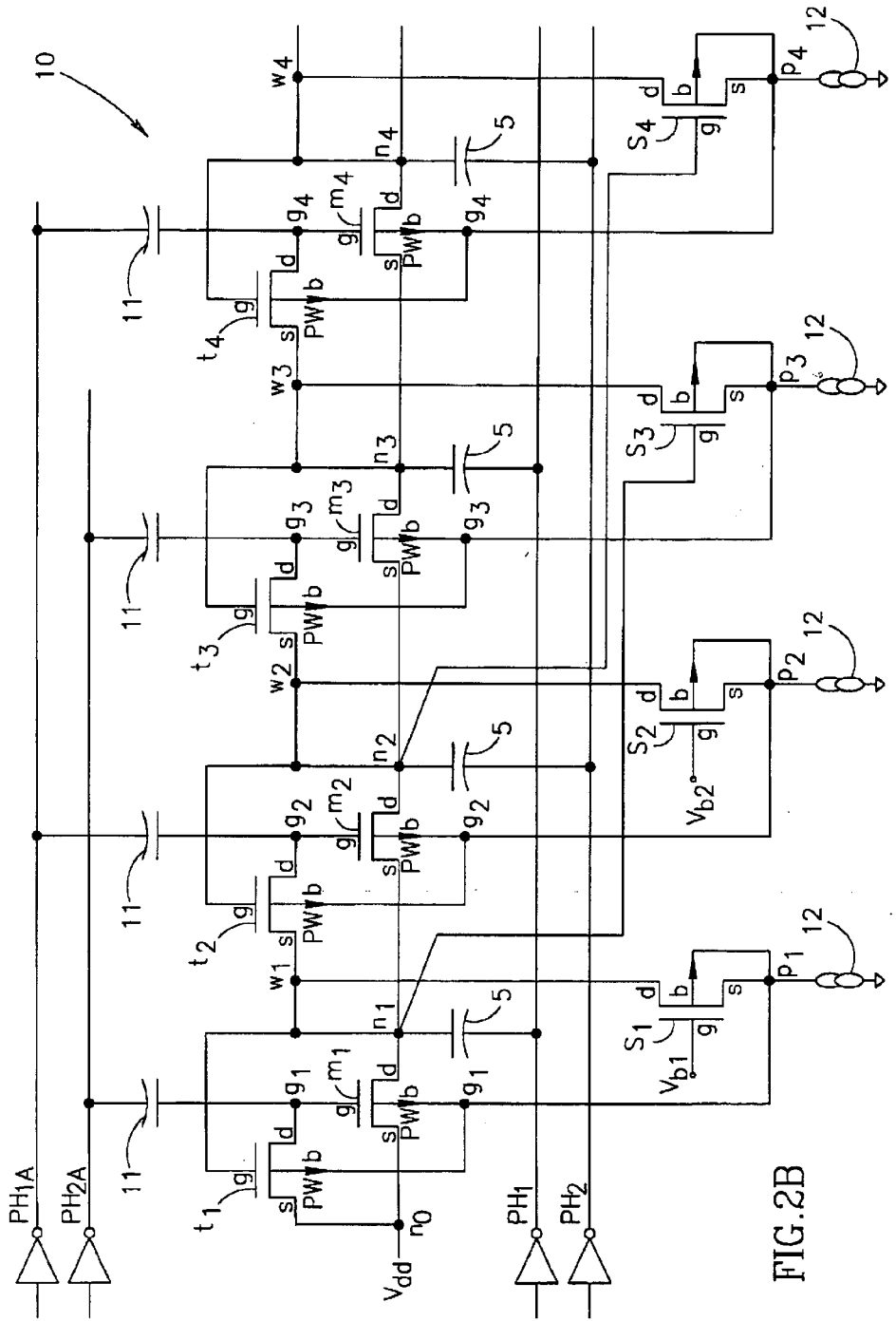
FIG. 2B is a simplified circuit diagram of a multi-stage charge pump, constructed and operative in accordance with a preferred embodiment of the present invention.

Reference is now made to FIG. 2B, which illustrates a multi-stage charge pump 10 in accordance with a preferred embodiment of the present invention.

Figure 1A:
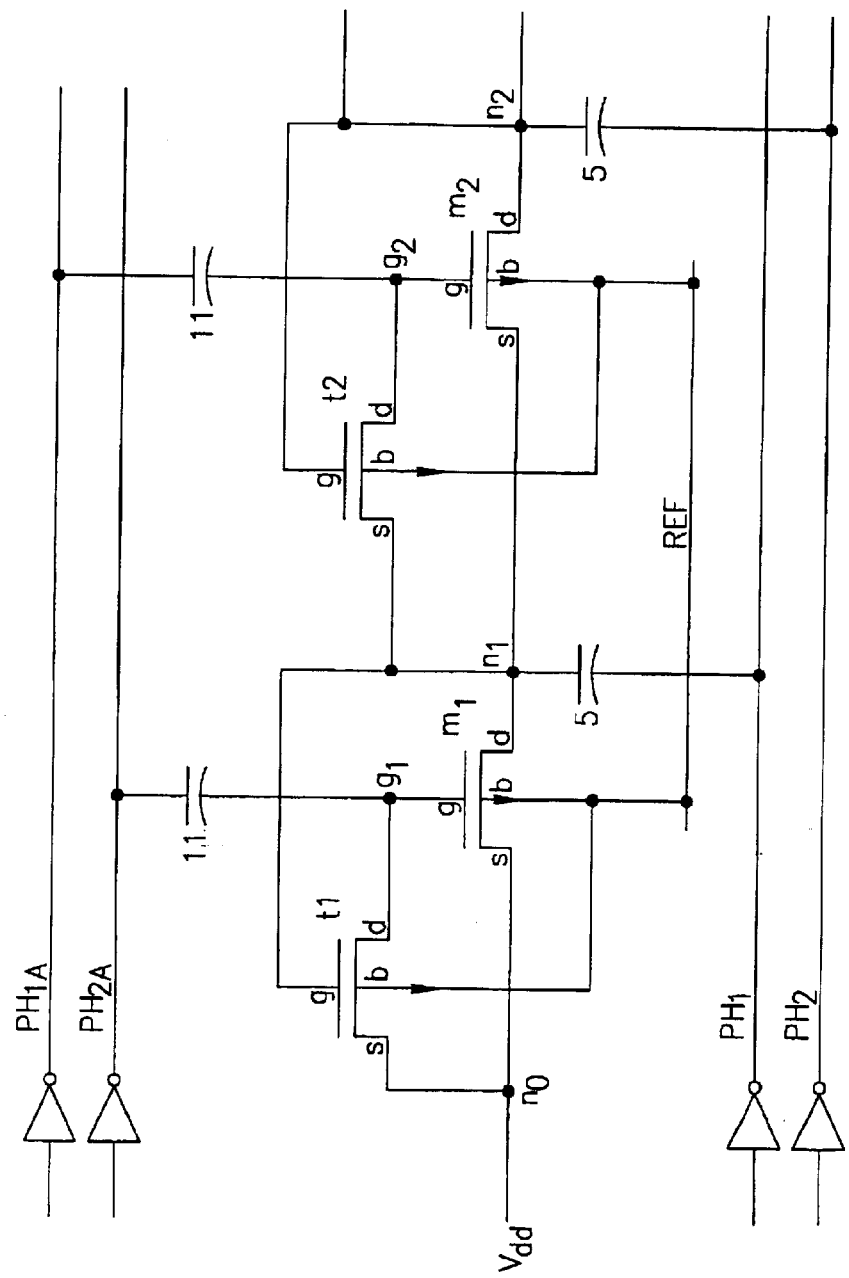
Figure 1B:
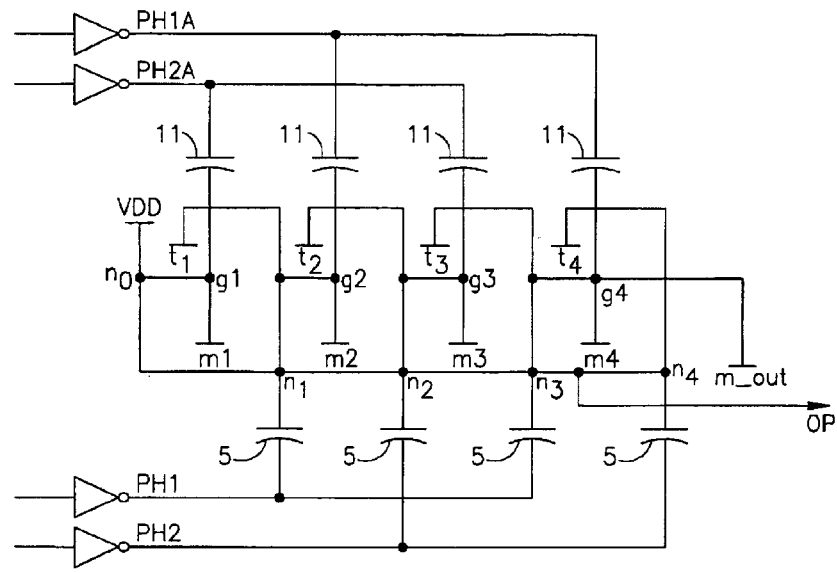
Figure 1B:
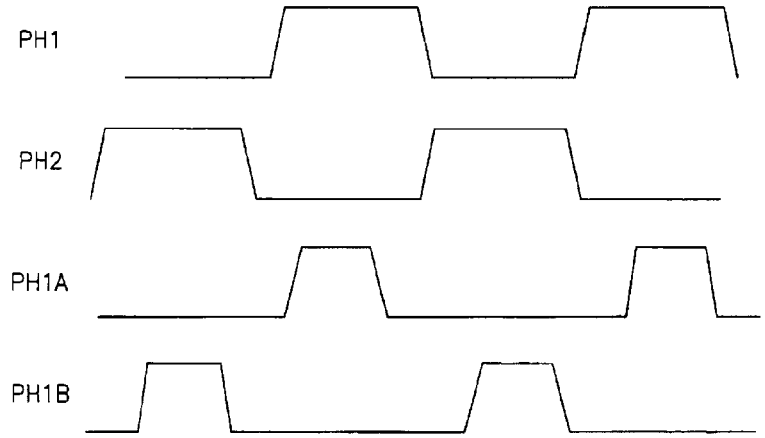

Charge pump 10, as seen in FIG. 2B, preferably has the basic construction of the prior art charge pump shown and described with reference to FIG. 1B. However, charge pump 10 differs from the prior art in that the circuitry of charge pump 10 includes an additional transistor $s_i$, preferably configured as a source follower. In the present invention, the input of the source follower $s_i$ is from a previous pump stage and is used to drive the bulk of a subsequent pump stage, as is described hereinbelow. The source followers $s_i$ (i.e., $s_1$, $s_2$, $s_3$ and $s_4$, in the embodiment illustrated in FIG. 2B) may also be, although not necessarily, NMOS transistors.

It is appreciated by the skilled artisan that although charge pump 10 is illustrated and described as having the basic construction of the prior art charge pump shown and described with reference to FIG. 1B, with the addition of the source followers $s_i$, nevertheless this is only done for the sake of convenience and simplicity, and the invention is not limited to the circuitry shown in FIG. 2B.

In the circuitry of FIG. 2B, in addition to the circuitry shown and described with reference to FIG. 1B, the gate of source follower $s_1$ is connected to a bias voltage $V_{b1}$. The source and bulk of source follower $s_1$ are connected to the bulk of charge transfer transistor $m_1$ and to the bulk of auxiliary transistor $t_1$ via a node $p_1$ and a node $q_1$. Node $p_1$ may be connected to a bleeder element 12, which may be a current source, and which is described further hereinbelow with reference to FIG. 3. The drain of source follower $s_1$ is connected to a high voltage, such as at a node $w_1$ connected to the source of auxiliary transistor $t_2$ (as shown in FIG. 2B), which may be the pump output or the stage output, or node $g_1$ connected to the drain of auxiliary transistor $t_1$, for example. It is noted that throughout the specification and claims, the "gate" of a transistor is also generally referred to as a control terminal, and the "source", "drain" and "bulk" are referred to as terminals.

The gate of source follower $s_2$ is connected to a bias voltage $V_{b2}$. The source and bulk of source follower $s_2$ are connected to the bulk of charge transfer transistor $m_2$ and to the bulk of auxiliary transistor $t_2$ via a node $p_2$ and a node $q_2$. Node $p_2$ may be connected to a bleeder element 12. The drain of source follower $s_2$ is connected to a high voltage, such as at node $w_2$ connected to the source of auxiliary transistor $t_3$ (as shown in FIG. 2B), or node $g_2$ connected to the drain of auxiliary transistor $t_2$, for example.

The gate of source follower $s_3$ is connected to node $n_1$, which means that the gate of source follower $s_3$ is connected to the source of charge transistor $m_2$. The source and bulk of source follower $s_3$ are connected to the bulk of charge transfer transistor $m_3$ and to the bulk of auxiliary transistor $t_3$ via a node $p_3$ and a node $q_3$. Node $p_3$ may be connected to a bleeder element 12. The drain of source follower $s_3$ is connected to a high voltage, such as at node $w_3$ connected to the source of auxiliary transistor $t_4$ (as shown in FIG. 2B), or node $g_3$ connected to the drain of auxiliary transistor $t_3$, for example.

Similarly, the gate of source follower $s_4$ is connected to node $n_2$, which means that the gate of source follower $s_4$ is connected to the source of charge transistor $m_3$. The source and bulk of source follower $s_4$ are connected to the bulk of charge transfer transistor $m_4$ via a node $p_4$ and a node $q_4$. Node $p_4$ may be connected to a bleeder element 12. The drain of source follower $s_4$ is connected to a high voltage, such as at node $w_4$ connected to the source of another auxiliary transistor $t_5$ (not shown in FIG. 2B), or node $g_4$ connected to the drain of auxiliary transistor $t_4$, for example.

It is seen that for i>2, the gate of each source follower $s_i$ ($s_3$ or $s_4$, in FIG. 2B) at the present stage (i.e., the i stage) is driven by an input voltage from the previous stage (i.e., the input to the charge transfer transistor $m_{i-1}$ at the i–1 stage, connected to the $n_{i-2}$ node). The source of each source follower $s_i$ at the present stage (i.e., the i stage) drives the bulk of the present stage (i.e., the i stage). The drain of each source follower $s_i$ is connected to a high voltage, such as at a node $w_i$, which may be the pump output or the stage output, for example.

The bias voltages $V_{b1}$ and $V_{b2}$, which drive the gate of source followers $s_1$ and $s_2$, respectively, may be from some intermediate available voltage that drives the P-well of the charge transfer transistors $m_1$ and $m_2$, respectively, to a level not greater than the minimum of the source and drain of that charge transfer transistor ($m_1$ or $m_2$, respectively). It is also possible that $V_{b2}$ is connected to $V_{dd}$ at node $n_0$.

Figure 3:
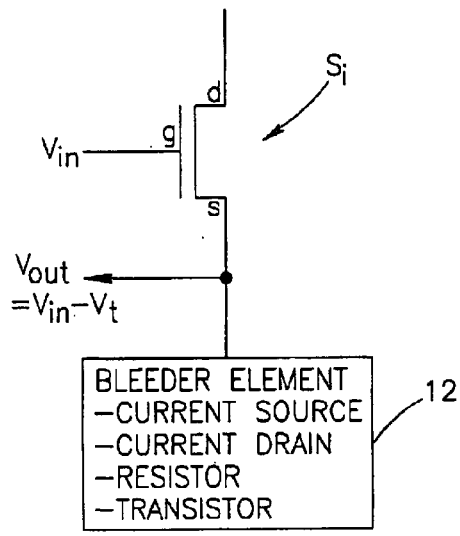
FIG. 3 is a simplified circuit diagram of a source follower useful in the charge pump of FIG. 2A or FIG. 2B, in accordance with a preferred embodiment of the present invention.

Reference is now made to FIG. 3, which illustrates source follower $s_i$ in more detail. Source follower $s_i$ receives an input voltage $V_{in}$ at its gate g, and outputs an output voltage $V_{out}$ at its source s, wherein the output voltage $V_{out}$ is lower than the input voltage $V_{in}$ by the threshold voltage $V_t$. The source of source follower $s_i$ may be connected to a bleeder element 12, which may be a current source (as shown in the illustration), current drain, resistor, transistor and the like. Once the output of the source follower $s_i$ reaches the output voltage $V_{out}$ (which equals $V_{in}-V_t$), then the potential between the gate and the source ($V_{gs}$) of the source follower $s_i$ adjusts itself to drive the current source load. When this load is small, then the gate-source bias $V_{gs}$ of the source follower $s_i$ is several mV above the threshold voltage $V_t$.

Referring again to FIG. 2B, it is seen that in terms of the terminology of FIG. 3, the input voltage $V_{in}$ for the source follower $s_i$ at each charge pump stage (after charge transfer transistors $m_1$ and $m_2$) is the source voltage of the charge transfer transistor $m_{i-1}$ of the previous charge pump stage. The input voltages $V_{in}$ for the source followers $s_1$ and $s_2$ are preferably bias voltages $V_{b1}$ and $V_{b2}$, as mentioned above. The output voltage $V_{out}$ of each source follower $s_i$ is less than or equal to the voltage $V_{in}$, because $V_{out}=V_{in}-V_t$. The output voltage $V_{out}$ drives the bulk of the present stage.

Figure 5:
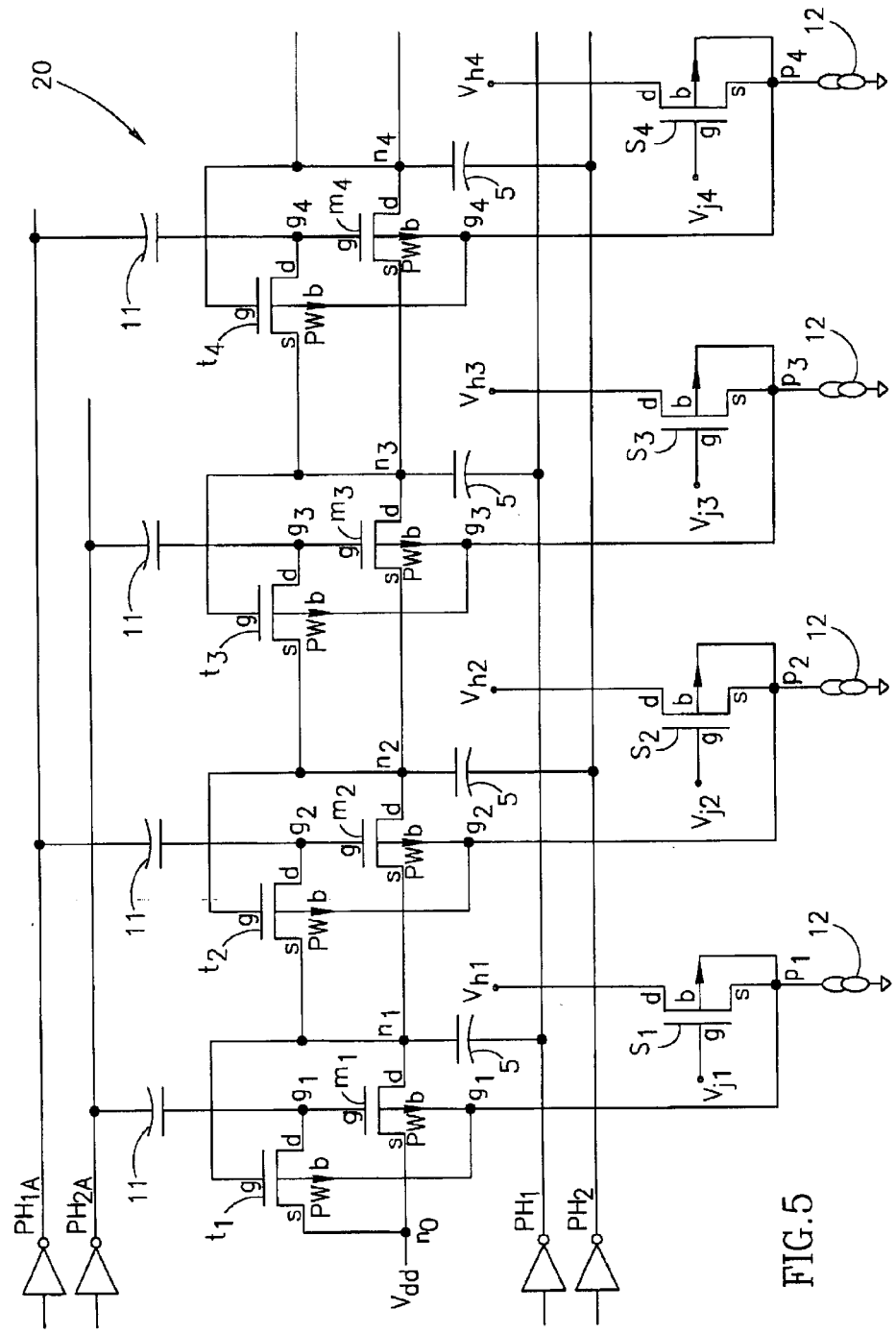
FIG. 5 is a simplified circuit diagram of a multi-stage charge pump, constructed and operative in accordance with another preferred embodiment of the present invention.
Figure 6:
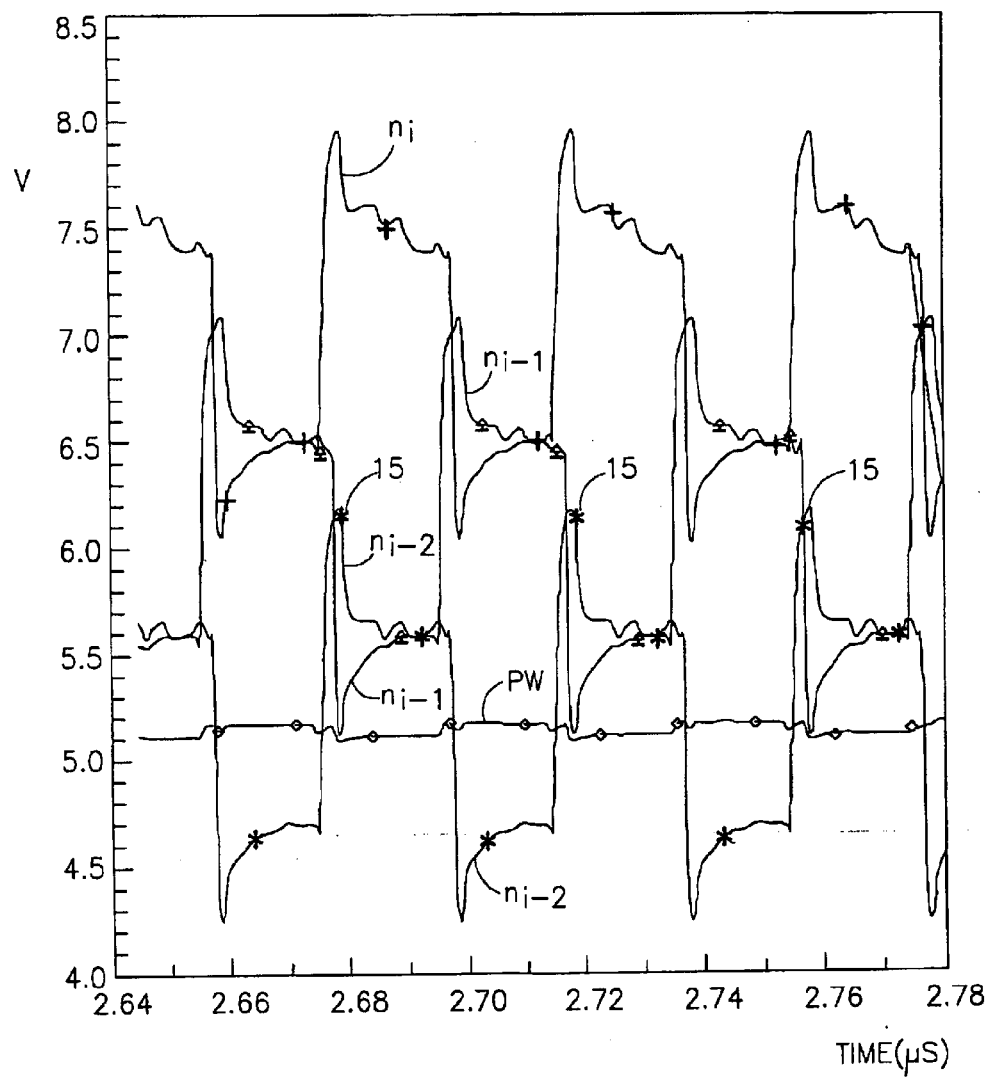
FIG. 6 is a simplified graphical illustration of simulated waveforms for the charge pumps of FIGS. 2B and 5, in accordance with a preferred embodiment of the present invention.

Reference is now made to FIG. 6 which illustrates simulated waveforms for the charge pump 10 (or the charge pump which will be described with reference to FIG. 5), in accordance with a preferred embodiment of the present invention. It is noted that when comparing node $n_{i-2}$ to node $n_{i-1}$, the average voltage of node $n_{i-1}$ is greater than that of node $n_{i-2}$. However, during the stage when charge is transferred from node $n_{i-2}$ to node $n_{i-1}$, the voltage of node $n_{i-2}$ is briefly higher than that of node $n_{i-1}$ for a short transient period, such transient periods being designated by reference numeral 15 in FIG. 6. During the transient period 15, the source follower $s_i$ is conducting, and the source voltage of source follower $s_i$ is raised to a level of $V_{in}-V_t$, or in other words, the voltage of node $n_{i-2}$ minus the threshold voltage $V_t$. The source follower $s_i$ may be constructed such that the voltage value ($n_{i-2}-V_t$) during the transient period 15 is always less than the minimum voltage of nodes $n_{i-1}$ and $n_i$. If the voltage value ($n_{i-2}-V_t$) is determined to be above the minimum of the source and drain voltages of the $n_i$ stage, then the input to source follower $s_i$ may be connected to node $n_{i-3}$ or $n_{i-4}$ and so forth.

During all other points in the cycle, the voltage of node $n_{i-2}$ drops below the PW voltage and the source follower $s_i$ is in a non-conducting state. Since the source follower $s_i$ is a small transistor driving a primarily capacitive load, the amount of current consumption it requires is negligible.

It follows that in the present invention, the voltage level of the bulk of each charge transfer transistor $m_i$ is raised to a level not greater than the minimum of the voltage level of the source and drain of that charge transfer transistor $m_i$. The architecture of the present invention ensures that the P-well/bulk of each charge pump stage is raised to a level less than or equal to the minimum, during the entire clock cycle, of the source/drain voltage at that stage, which minimizes the bulk effect, and at the same time ensures that no diodes are forward biased.

Ensuring that the voltage level of the bulk of each charge transfer transistor $m_i$ is raised to a level not greater than the minimum of the voltage level of the source and drain of that charge transfer transistor m; may be carried out with other circuit elements other than a source follower. For example, as seen in FIG. 4, the bulk of the charge transfer transistor 14 may be driven by a comparator, level shifter, operative amplifier (OP-AMP), inverting stage and the like.

Reference is now made to FIG. 5, which illustrates a charge pump 20 constructed and operative in accordance with another preferred embodiment of the present invention. Charge pump 20, as seen in FIG. 5, preferably has the basic construction of charge pump 10 shown and described with reference to FIG. 2B. However, charge pump 20 differs from charge pump 10 in that the bias on the gate of source follower $s_i$ is not from node $n_{i-2}$, but rather from some other intermediate available voltage $V_{ji}$ (in FIG. 5, $V_{j1}$, $V_{j2}$, $V_{j3}$ and $V_{j4}$). Voltage $V_{ji}$ drives the P-well of the charge transfer transistors to a level not greater than the source/drain (i.e., the minimum of the source and drain) of the charge transfer transistors of that charge pump stage. In a preferred embodiment, as in FIG. 2B, $V_{ji}$ is the voltage from node $n_{i-2}$. Another possibility within the scope of the invention is that the bias on the drain of source follower $s_i$ is not connected to node $w_i$ or $g_i$, but rather to some other available high voltage $V_{hi}$ (in FIG. 5, $V_{h1}$, $V_{h2}$, $V_{h3}$ and $V_{h4}$). In a preferred embodiment, $V_{hi}$ is the voltage from node $g_i$, but may alternatively be the voltage from node $n_i$ or from the pump output, for example. The skilled artisan will appreciate that these are just examples of many other variations possible within the scope of the invention.

It will be appreciated by person skilled in the art, that the present invention is not limited by what has been particularly shown and described herein above. Rather the scope of the present invention is defined only by the claims which follow:

What is claimed is:

1. A charge pump comprising:

a plurality of positive charge pump stages, each stage comprising at least one NMOS charge transfer transistor;

a circuit to provide a bulk voltage of said at least one charge transfer transistor at a level not greater than a minimum of a voltage level of a source and a drain of said at least one charge transfer transistor in that charge pump stage; and an input to a previous charge pump stage is also connected on input to said circuit.

2. A charge pump comprising:

a plurality of positive charge pump stages, each stage comprising multiple transistors at least one of which is an NMOS charge transfer transistor;

a circuit to bias a bulk of at least one of said transistors of at least one of said charge pump stages so as to reduce body effect without parasitic diodes of said at least one transistor; and an input to a previous charge pump stage is used as an input to said circuit.

3. The charge pump according to claim 2 wherein said circuit provides a bulk voltage of at least one of said charge transfer transistors to a level not greater than a minimum of a voltage level of a source and a drain of said at least one charge transfer transistor in that charge pump stage.

* * * * *